(12) United States Patent
Ando

(10) Patent No.: US 9,243,575 B2
(45) Date of Patent: Jan. 26, 2016

(54) APPARATUS FOR CONTROLLING THE LEARNING OF THE AIR FUEL RATIO OF AN INTERNAL COMBUSTION ENGINE

(71) Applicant: Daigo Ando, Nagano (JP)

(72) Inventor: Daigo Ando, Nagano (JP)

(73) Assignee: TOYODA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/419,388

(22) PCT Filed: Oct. 16, 2013

(86) PCT No.: PCT/IB2013/002298
§ 371 (c)(1),
(2) Date: Feb. 3, 2015

(87) PCT Pub. No.: WO2014/068378
PCT Pub. Date: May 8, 2014

(65) Prior Publication Data
US 2015/0176511 A1    Jun. 25, 2015

(30) Foreign Application Priority Data

Nov. 2, 2012   (JP) .................................. 2012-242537

(51) Int. Cl.
*F01N 3/36*     (2006.01)
*F02D 41/02*    (2006.01)
(Continued)

(52) U.S. Cl.
CPC ................ *F02D 41/024* (2013.01); *F01N 3/20* (2013.01); *F02D 41/005* (2013.01);
(Continued)

(58) Field of Classification Search
CPC ... F01N 3/101; F01N 3/2033; F01N 2430/06; F01N 2610/03; F01N 2900/0402; F01N 2900/0412; F01N 2900/08; F02D 41/3094; B60K 6/20; B60K 6/365; Y10S 903/902; Y10S 903/91
USPC ................... 60/278, 285, 286, 300, 303, 320; 123/207, 208, 445; 180/65.21; 903/902
See application file for complete search history.

(56) References Cited

U.S. PATENT DOCUMENTS 7,438,067 B2 * 10/2008 Saito ................... F02D 41/1438
                                                                                         123/697
2009/0138181 A1 * 5/2009 Hokuto ............... F02D 41/1475
                                                                                         701/106

FOREIGN PATENT DOCUMENTS

JP    11-022510 A    1/1999
JP    2001-012286 A  1/2001
(Continued)

OTHER PUBLICATIONS

International Search Report issued May 6, 2014 in PCT/IB13/002298 filed Oct. 16, 2013.

*Primary Examiner* — Thomas Denion
*Assistant Examiner* — Jorge Leon, Jr.
(74) *Attorney, Agent, or Firm* — Oblon, McClelland, Maier & Neustadt, L.L.P.

(57) ABSTRACT

If an amount of fuel is not increased and a direct injection air-fuel ratio learning has not been completed, fuel injection from a port fuel injection valve is stopped without executing EGR, fuel injection control is executed such that the fuel injection occurs only from an in-cylinder fuel injection valve, and the direct injection air-fuel ratio learning is executed. If the amount of the fuel is increased, the fuel injection from the port fuel injection valve is stopped without executing EGR and air-fuel ratio feedback control, and an engine and an EGR valve are controlled such that fuel injection occurs only from the in-cylinder fuel injection valve.

6 Claims, 9 Drawing Sheets

(51) Int. Cl.
  *F02D 41/14* (2006.01)
  *F02D 41/24* (2006.01)
  *F02D 41/30* (2006.01)
  *F02D 41/00* (2006.01)
  *B60K 6/365* (2007.10)
  *F01N 3/20* (2006.01)

(52) U.S. Cl.
  CPC ......... *F02D 41/025* (2013.01); *F02D 41/1402* (2013.01); *F02D 41/2441* (2013.01); *F02D 41/2445* (2013.01); *F02D 41/2454* (2013.01); *F02D 41/3029* (2013.01); *F02D 41/3094* (2013.01); *B60K 6/365* (2013.01); *F01N 3/2033* (2013.01); *F01N 2430/06* (2013.01); *F01N 2610/03* (2013.01); *F01N 2900/0402* (2013.01); *F01N 2900/0412* (2013.01); *F01N 2900/08* (2013.01); *Y02T 10/26* (2013.01); *Y02T 10/47* (2013.01); *Y10S 903/91* (2013.01)

(56) References Cited

FOREIGN PATENT DOCUMENTS

| JP | 2007-187071   | 7/2007  |
| JP | 2009-030615 A | 2/2009  |
| JP | 2009-040234 A | 2/2009  |
| JP | 2009-074483   | 4/2009  |
| JP | 2009-257192 A | 11/2009 |
| JP | 2011-111961   | 6/2011  |

* cited by examiner

APPARATUS FOR CONTROLLING THE LEARNING OF THE AIR FUEL RATIO OF AN INTERNAL COMBUSTION ENGINE

BACKGROUND OF THE INVENTION

1. Field of the Invention

The invention relates to a control device for an internal combustion engine and a hybrid vehicle. More specifically, the invention relates to a control device for an internal combustion engine that is equipped with an in-cylinder fuel injection valve that injects fuel into a cylinder, a port fuel injection valve that injects fuel into an intake port, a purification catalyst that is provided in an exhaust system, and an exhaust gas recirculation device that recirculates exhaust gas of the internal combustion engine to an intake system of the internal combustion engine, and to a hybrid vehicle that is equipped with the control device for the internal combustion engine.

2. Description of Related Art

Conventionally, as this kind of control device for an internal combustion engine, there has been proposed a control device that calculates an adhesion ratio as a ratio of adhesion of fuel injected from an injector to a wall surface of an intake port and a wall surface of an intake valve and a residual ratio as a ratio of port adherent fuel and valve adherent fuel remaining adherent to the wall surface of the intake port and the wall surface of the intake valve, referring to a map, and calculates a fuel injection amount through model calculation using the calculated residual ratio and the calculated adhesion ratio as parameters during base operation in which the target air-fuel ratio is set to a value in the vicinity of a stoichiometric air-fuel ratio (e.g., see Japanese Patent Application Publication No. 2007-187071 (JP-2007-187071 A). If the amount of fuel is increased with the target air-fuel ratio being set different from a value during base operation, this control device calculates a residual ratio and an adhesion ratio at the time of the increase in the amount of fuel referring to a map other than the one used during base operation, and calculates a fuel injection amount through model calculation using the calculated residual ratio and the calculated adhesion ratio as parameters. Thus, the fuel supplied into the cylinder is optimized.

By the way, in a control device for controlling an internal combustion engine that is equipped with an in-cylinder fuel injection valve that injects fuel into a cylinder, a port fuel injection valve that injects fuel into an intake port, and an exhaust gas recirculation device that recirculates exhaust gas of the internal combustion engine to an intake system, the suppression of a deterioration in exhaust emission properties at the time of an increase in the amount of fuel for increasing the amount of injected fuel with a view to adjusting the temperature of an exhaust catalyst has been recognized as a task. In fuel injection control of the internal combustion engine, air-fuel ratio learning as the learning of a fuel injection amount for making the air-fuel ratio approach a theoretical air-fuel ratio is executed to restrain the exhaust emission properties from deteriorating. However, when the amount of fuel is increased, the execution of this air-fuel ratio learning is not suitable. Thus, it has been desired to restrain the exhaust emission properties from deteriorating by executing air-fuel ratio learning at a more suitable timing.

SUMMARY OF THE INVENTION

A control device for an internal combustion engine and a hybrid vehicle according to the invention restrains the exhaust emission properties from deteriorating when the amount of fuel is increased.

The gist of a control device for an internal combustion engine according to an aspect of the invention is as follows. The control device is designed for the internal combustion engine that is equipped with an in-cylinder fuel injection valve that injects a fuel into a cylinder, a port fuel injection valve that injects fuel into an intake port, a purification catalyst that is provided in an exhaust system, and an exhaust gas recirculation device that recirculates exhaust gas of the internal combustion engine to an intake system of the internal combustion engine. The control device executes first control in which a temperature of a catalyst is adjusted by increasing a fuel injection amount in comparison with an amount during normal operation, executes second control in which a fuel injection amount of the in-cylinder fuel injection valve is learned by stopping fuel injection from the port fuel injection valve and executing fuel injection from the in-cylinder fuel injection valve such that an air-fuel ratio approaches a theoretical air-fuel ratio, executes the fuel injection from the port fuel injection valve and exhaust gas recirculation control by the exhaust gas recirculation device when the first control is not executed and execution of the second control has been completed, stops the fuel injection from the port fuel injection valve and the exhaust gas recirculation control by the exhaust gas recirculation device, and executes fuel injection control from the in-cylinder fuel injection valve and the second control when the first control is not executed and the execution of the second control has not been completed, and stops the fuel injection from the port fuel injection valve and the exhaust gas recirculation control by the exhaust gas recirculation device when the first control is executed, and executes the fuel injection from the in-cylinder fuel injection valve with a fuel injection amount based on a learning value obtained through the second control.

In this control device for the internal combustion engine according to the aspect of the invention, the first control in which the amount of fuel injection is increased in comparison with an amount during the normal operation and the temperature of the catalyst is adjusted is executed, the second control in which the fuel injection amount of the in-cylinder fuel injection valve is learned by stopping the fuel injection from the port fuel injection valve and executing the fuel injection from the in-cylinder fuel injection valve is executed such that the air-fuel ratio approaches the theoretical air-fuel ratio, and the fuel injection from at least the port fuel injection valve and the exhaust gas recirculation control by the exhaust gas recirculation device are executed if the first control is not executed and the execution of the second control has been completed. Thus, the internal combustion engine can be operated while restraining the temperature of the port fuel injection valve from rising due to the exhaust gas recirculation control. Then, the second control is executed by stopping the fuel injection from the port fuel injection valve and the exhaust gas recirculation control by the exhaust gas recirculation device and executing the fuel injection control from the in-cylinder fuel injection valve if the first control is not executed and the execution of the second control has not been completed. Thus, the in-cylinder fuel injection air-fuel ratio learning can be executed with the fuel injection from the port fuel injection valve and the exhaust gas recirculation control by the exhaust gas recirculation device stopped, and with the internal combustion engine operated along with the fuel injection by the in-cylinder fuel injection valve. Furthermore, the fuel injection from the port fuel injection valve and the exhaust gas recirculation control by the exhaust gas recirculation device are stopped, and the fuel injection from the in-cylinder fuel injection valve is executed with the fuel injection amount based on the learning value obtained through the second control, if the first control is executed. Thus, the temperature of the purification catalyst can be adjusted while restraining hydrocarbons (HC) from adhering to an intake system and the port fuel injection valve due to the exhaust gas recirculation control and restraining the temperature of the in-cylinder fuel injection valve from rising. At this time, the fuel injection from the port fuel injection valve and the exhaust gas recirculation control by the exhaust gas recirculation device are stopped, and the fuel injection from the in-cylinder fuel injection valve is executed with the fuel injection amount based on the learning value obtained through the second control. Therefore, a more suitable amount of fuel can be injected. As a result, the exhaust emission properties can be restrained from deteriorating when the amount of fuel is increased.

This control device for the internal combustion engine according to the aspect of the invention may execute fuel injection from the in-cylinder fuel injection valve and the exhaust gas recirculation control by the exhaust gas recirculation device when the execution of the second control has been completed and a rotational speed of the internal combustion engine is lower than a predetermined rotational speed. Alternatively, the control device may execute fuel injection from the in-cylinder fuel injection valve and the exhaust gas recirculation control by the exhaust gas recirculation device when the execution of the second control has been completed and an intake air amount of the internal combustion engine is smaller than a predetermined air amount. In this manner, a shock can be restrained from occurring due to the start of the operation of the internal combustion engine along with the exhaust gas recirculation control by the exhaust gas recirculation device.

A hybrid vehicle according to an aspect of the invention may be equipped with an in-cylinder fuel injection valve that injects fuel into a cylinder, a port fuel injection valve that injects the fuel into an intake port, a purification catalyst that is provided in an exhaust system, an exhaust gas recirculation device that executes exhaust gas recirculation control in which exhaust gas of an internal combustion engine is recirculated to an intake system of the internal combustion engine, the internal combustion engine that outputs a motive power from an output shaft of the internal combustion engine to a drive shaft that is coupled to an axle, an electric motor to/from which a motive power is input/output from/to the drive shaft, a battery that exchanges an electric power with the electric motor, and the control device according to any one of the foregoing aspects of the invention that controls the internal combustion engine. That is, the gist of the control device for the internal combustion engine is basically as follows. The control device for the internal combustion engine is equipped with an in-cylinder fuel injection valve that injects a fuel into a cylinder, a port fuel injection valve that injects fuel into an intake port, a purification catalyst that is provided in an exhaust system, and an exhaust gas recirculation device that recirculates exhaust gas of the internal combustion engine to an intake system of the internal combustion engine. The control device executes first control in which a temperature of a catalyst is adjusted by increasing a fuel injection amount in comparison with an amount during normal operation, executes second control in which a fuel injection amount of the in-cylinder fuel injection valve is learned by stopping fuel injection from the port fuel injection valve and executing fuel injection from the in-cylinder fuel injection valve such that an air-fuel ratio approaches a theoretical air-fuel ratio, executes fuel injection from at least the port fuel injection valve and the exhaust gas recirculation control by the exhaust gas recirculation device if the first control is not executed and the execution of the second control has been completed, stops the fuel injection from the port fuel injection valve and the exhaust gas recirculation control by the exhaust gas recirculation device, executes the fuel injection control from the in-cylinder fuel injection valve and executes the second control if the first control is not executed and the execution of the second control has not been completed, and stops the fuel injection from the port fuel injection valve and the exhaust gas recirculation control by the exhaust gas recirculation device if the first control is executed, and executes the fuel injection from the in-cylinder fuel injection valve with a fuel injection amount based on a learning value obtained through the second control.

This hybrid vehicle according to the aspect of the invention is equipped with the control device for the internal combustion engine according to any one of the foregoing aspects of the invention, and hence achieves an effect similar to the effect achieved by the control device for the internal combustion engine according to the invention, for example, the effect of making it possible to restrain the exhaust emission properties from deteriorating when the amount of fuel is increased, or the like.

Besides, in the hybrid vehicle according to the aspect of the invention, fuel injection from the port fuel injection valve and the exhaust gas recirculation control by the exhaust gas recirculation device may be executed when the execution of the second control has been completed within a period from a beginning of operation after first start of the internal combustion engine since turning on of an ignition to stop of the internal combustion engine, and the fuel injection from the port fuel injection valve and the exhaust gas recirculation control by the exhaust gas recirculation device may be stopped, the fuel injection by the in-cylinder fuel injection valve may be executed, and the second control may be executed when the execution of the second control has not been completed within the period from the beginning of the operation after the first start of the internal combustion engine since turning on of the ignition to stop of the internal combustion engine. In this manner, when the internal combustion engine is started to begin the operation thereof, the fuel injection from the in-cylinder fuel injection valve is executed with a fuel injection amount that uses a learning value obtained from in-cylinder fuel injection air-fuel ratio learning, namely, a fuel injection amount that uses a learning value that is obtained with fuel injection from the port fuel injection valve and the exhaust gas recirculation control by the exhaust gas recirculation device stopped and with the internal combustion engine operated along with the fuel injection by the in-cylinder fuel injection valve. Therefore, a more suitable amount of fuel can be injected. As a result, the exhaust emission properties can be restrained from deteriorating when the internal combustion engine is started.

Furthermore, the hybrid vehicle according to the aspect of the invention can be equipped with an electric generator to/from which a motive power is input/output, and a planetary gear mechanism having three rotary elements that are connected to three shafts, namely, the drive shaft, the output shaft of the internal combustion engine, and a rotary shaft of the electric generator.

BRIEF DESCRIPTION OF THE DRAWINGS

Features, advantages, and technical and industrial significance of an exemplary embodiment of the invention will be described below with reference to the accompanying-drawings, in which like numerals denote like elements, and wherein.

DETAILED DESCRIPTION OF EMBODIMENT

Next, a mode for carrying out the invention will be described using an embodiment thereof.

Figure 1:
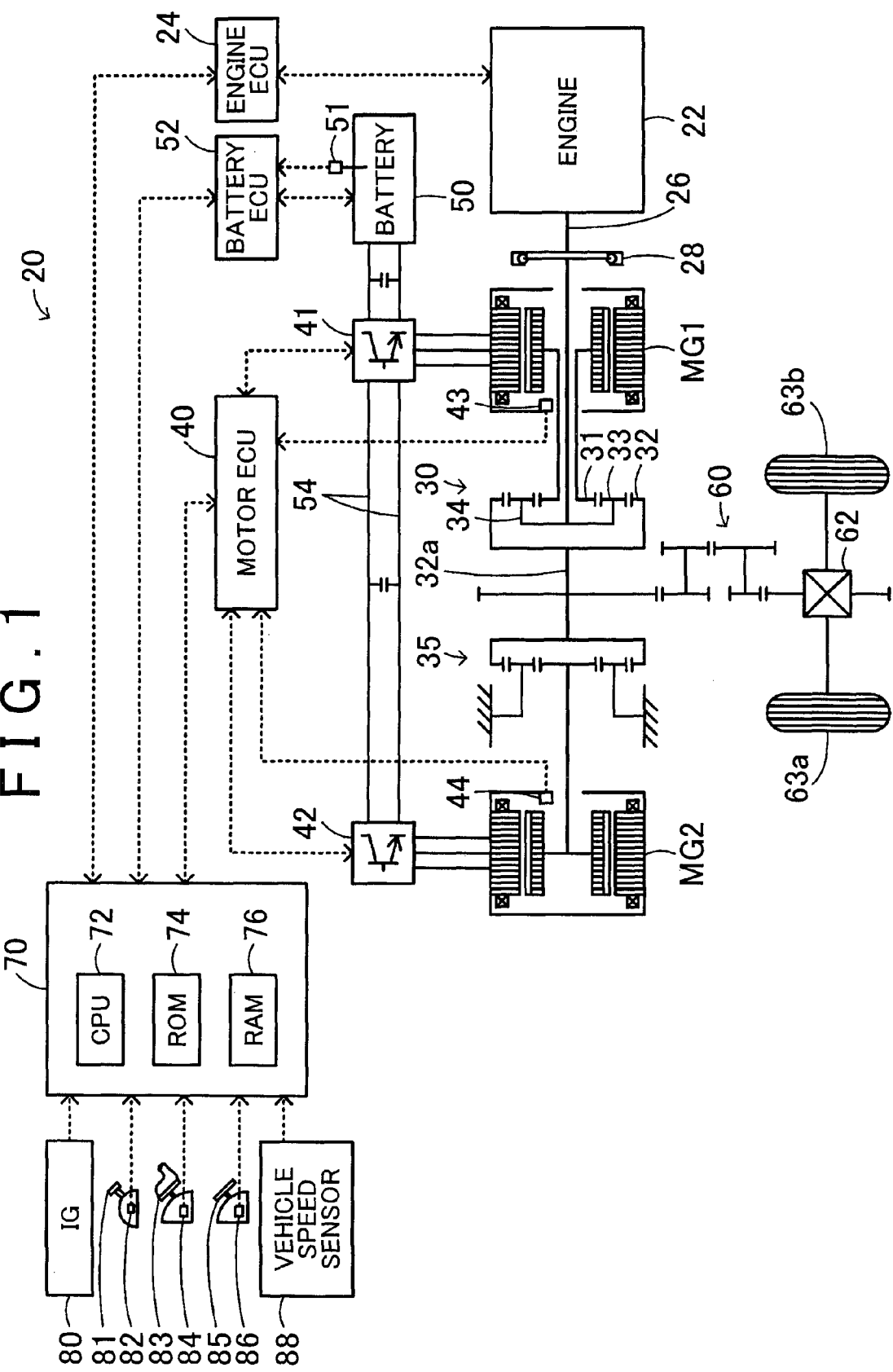
FIG. 1 is a block diagram showing the outline of a configuration of a hybrid vehicle as the embodiment of the invention.

FIG. 1 is a block diagram showing the outline of a configuration of a hybrid vehicle 20 as the embodiment of the invention. As shown in the drawing, the hybrid vehicle 20 according to the embodiment of the invention is equipped with an engine 22 that is configured as an internal combustion engine that outputs a motive power using gasoline, light oil or the like as fuel, and an engine electronic control unit (hereinafter referred to as an engine ECU) 24 that drivingly controls the engine 22. Furthermore, a motive power distribution/integration mechanism 30, an MG1, an MG2, inverters 41 and 42, a motor control unit 40, a battery 50, a battery electronic control unit 52, and a hybrid electronic control unit 70 are connected to a crankshaft 26 as an output shaft of the engine 22, via a damper 28. The motive power distribution/integration mechanism 30 is configured as a planetary gear mechanism in which a ring gear 32 is connected to a ring gear shaft 32a as a drive shaft to which a carrier 34 is connected and which is coupled to driving wheels 63a and 63b via a differential gear 62 and a gear mechanism 60. A plurality of pinion gears 33 are coupled to the carrier 34. The MG1 is configured as, for example, a well-known synchronous generator motor, and has a rotor that is connected to a sun gear 31 of the motive power distribution/integration mechanism 30. The MG2 is configured as, for example, a well-known synchronous generator motor, and has a rotor that is connected to the ring gear shaft 32a as the drive shaft via a reduction gear 35. The inverters 41 and 42 are provided to drive the motors MG1 and MG2. The motor control unit (hereinafter referred to as a motor ECU) 40 drivingly controls the motors MG1 and MG2 by controlling the inverters 41 and 42. The battery is configured as, for example, a lithium-ion secondary battery, and exchanges electric power with the motors MG1 and MG2 via the inverters 41 and 42. The battery electronic control unit (hereinafter referred to as a battery ECU) 52 manages the battery 50. The hybrid electronic control unit (hereinafter referred to as an HVECU) 70 controls the vehicle as a whole.

Figure 2:
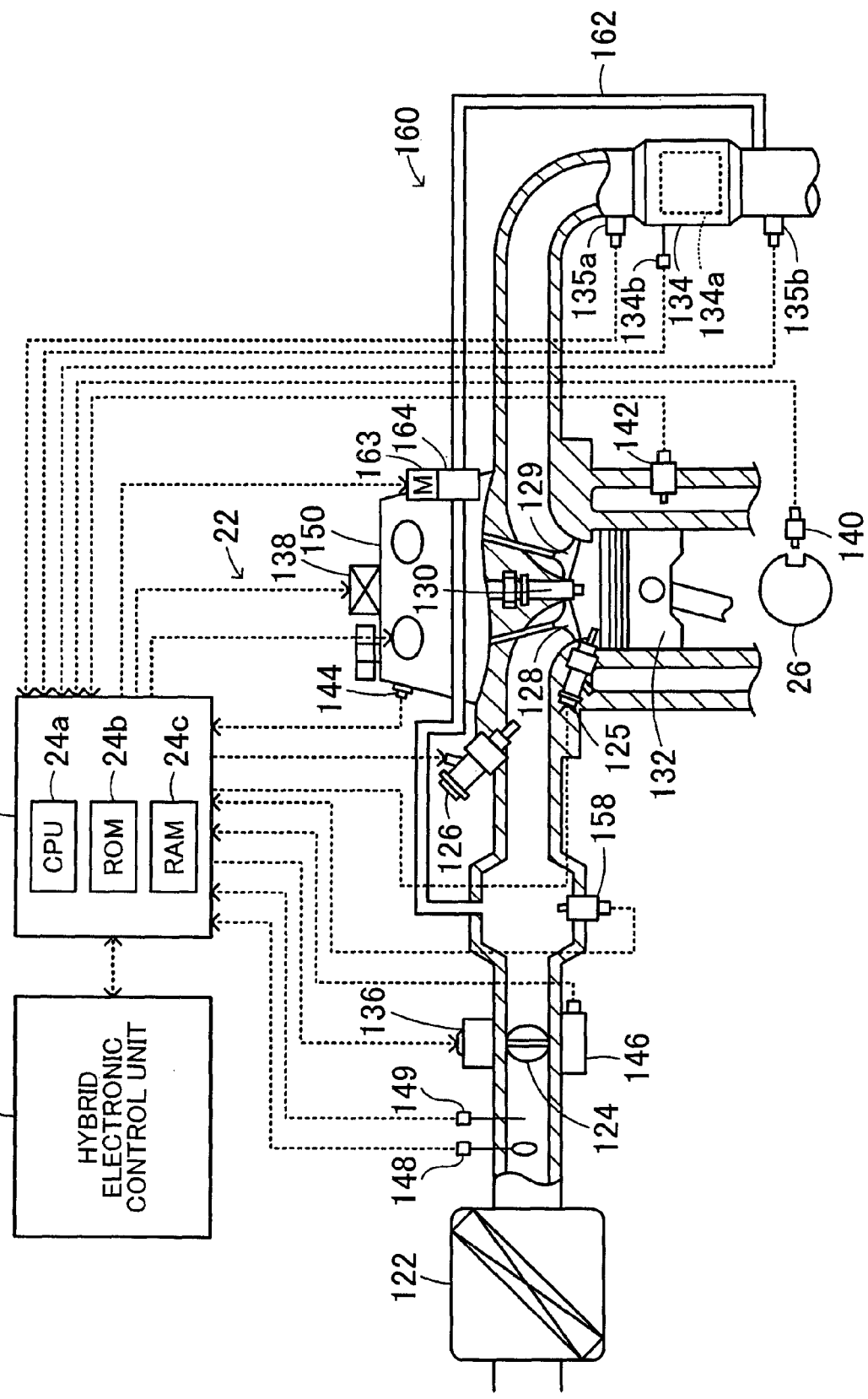
FIG. 2 is a block diagram showing the outline of a configuration of an engine.

As shown in FIG. 2, the engine 22 is configured as an internal combustion engine that is equipped with an in-cylinder fuel injection valve 125 that directly injects hydrocarbon fuel such as gasoline, light oil or the like into a cylinder, and a port fuel injection valve 126 that injects fuel into an intake port. The engine 22 is equipped with the in-cylinder fuel injection valve 125 and the port fuel injection valve 126 as these two kinds of fuel injection valves, and thus has the following injection drive modes. The first injection drive mode is a port injection drive mode in which fuel is injected from the port fuel injection valve 126, intake air and fuel are mixed with each other and exploded and burned through an electric spark generated by an ignition plug 130, and rotational movements of the crankshaft 26 are obtained. The second injection drive mode is an in-cylinder injection drive mode in which fuel is injected from the in-cylinder fuel injection valve 125, intake air and fuel are mixed with each other and exploded and burned through an electric spark generated by the ignition plug 130, and rotational movements of the crankshaft 26 are obtained. The third injection drive mode is a common injection drive mode in which fuel is injected from the port fuel injection valve 126 and the in-cylinder fuel injection valve 125, intake air and fuel are mixed with each other and exploded and burned through an electric spark generated by the ignition plug 130, and rotational movements of the crankshaft 26 are obtained. A changeover among these injection drive modes is made on the basis of an operation state of the engine 22, an operation state required of the engine 22, or the like. Exhaust gas from the engine 22 is discharged to outside air via a purification device 134 having a purification catalyst (a three-way catalyst) that purifies noxious components such as carbon monoxide (CO), hydrocarbons (HC), and nitrogen oxides (NOx), and is supplied to the intake side via an exhaust gas recirculation (EGR) system 160. The EGR system 160 is equipped with an EGR pipe 162 that is connected to a posterior stage of the purification device 134 to supply exhaust gas to a surge tank on the intake side, and an EGR valve 164 that is arranged in the EGR pipe 162 to be driven by a stepping motor 163. Furthermore, the opening degree of the EGR valve 164 is adjusted to adjust the supply amount of exhaust gas as unburned gas, and exhaust gas is supplied to the intake side. The engine 22 can thus suck the mixture of air, exhaust gas; and gasoline into a combustion chamber. Hereinafter, the supply of exhaust gas of the engine 22 to the intake side will be referred to as EGR.

The engine ECU 24 is configured as a microprocessor that is mainly constituted of a CPU 24a. In addition to the CPU 24a, the engine ECU 24 is equipped with a ROM 24b that stores a processing program, a RAM 24c that temporarily stores data, input/output ports (not shown), and communication ports (not shown). Signals from various sensors that detect the state of the engine 22 are input to the engine ECU 24 via the input ports. For example, it is possible to mention a crank position θcr from a crank position sensor 140 that detects a rotational position of the crankshaft 26, a coolant temperature Tw from a coolant temperature sensor 142 that detects a temperature of coolant of the engine 22, an in-cylinder pressure Pin from a pressure sensor 143 that is fitted in the combustion chamber, a cam angle from a cam position sensor 144 that detects a rotational position of an intake shaft that opens/closes an intake valve 128 for sucking intake air into the combustion chamber or an exhaust cam shaft that opens/closes an exhaust valve for discharging exhaust gas from the combustion chamber, a throttle opening degree TH from a throttle valve position sensor 146 that detects a position of a throttle valve 124, an intake air amount Qa from an air flow meter 148 that is attached to an intake pipe to detect a mass flow rate of intake air, an intake air temperature Ta from a temperature sensor 149 that is attached to the intake pipe, a catalyst temperature θc from a temperature sensor 134a that detects a temperature of the three-way catalyst of the purification device 134, an air-fuel ratio AF from an air-fuel ratio sensor 135a that is attached to an exhaust system, an oxygen concentration signal O2 from an oxygen sensor 135b that is attached to the exhaust system, a knock signal Ks from a knock sensor 159 that is attached to a cylinder block to detect vibrations resulting from the occurrence of knocking, an EGR valve opening degree EV from an EGR valve opening degree sensor 165 that detects an opening degree of the EGR valve 164, and the like. Various control signals for driving the engine 22 are output from the engine ECU 24 via the output ports. For example, it is possible to mention a drive signal to the in-cylinder fuel injection valve 125, a drive signal to the port fuel injection valve 126, a drive signal to a throttle motor 136 that adjusts the position of the throttle valve 124, a control signal to an ignition coil 138 that is integrated with an igniter, a control signal to a variable valve timing mechanism 150 that can change timings VT for opening/closing the intake valve 128, a drive signal to the stepping motor 163 that adjusts the opening degree of the EGR valve 164, and the like. Besides, the engine ECU 24 communicates with the HVECU 70, performs operation control of the engine 22 in accordance with a control signal from the HVECU 70, and outputs data on the operation state of the engine 22 according to need. The engine ECU 24 calculates a rotational speed of the crankshaft 26, namely, a rotational speed Ne of the engine 22 on the basis of a signal from the crank position sensor 140 that is attached to the crankshaft 26. The engine ECU 24 calculates a volumetric efficiency (a ratio of a volume of air actually sucked in during one cycle to a cylinder capacity of the engine 22 per cycle) KL, on the basis of the intake air amount Qa from the air flow meter 148 and the rotational speed Ne of the engine 22. The engine ECU 24 calculates the timings VT for opening/closing the intake valve 128 on the basis of an angle (θci−θcr) of a cam angle θci of the intake camshaft of the intake valve 128 from the cam position sensor 144 with respect to a crank angle θcr from the crank position sensor 140. The engine ECU 24 calculates a knock intensity Kr indicating an occurrence level of knocking on the basis of the magnitude and waveform of a knock signal Ks from the knock sensor 159. The engine ECU 24 calculates an EGR ratio Re as a ratio of an EGR amount Ve to the sum of the EGR amount Ve and the intake air amount Qa of the engine 22, on the basis of the intake air amount Qa from the air flow meter 148, the EGR valve opening degree EV from the EGR valve opening degree sensor 165, and the rotational speed Ne of the engine 22.

In the engine ECU 24, with a view to coping with cases where the theoretical air-fuel ratio cannot be realized due to the aging of parts despite an air-fuel ratio feedback correction, the learning of the air-fuel ratio (hereinafter referred to as air-fuel ratio learning) is executed. The engine ECU 24 performs intake air amount control, fuel injection control, ignition control and the like such that the engine 22 is operated in a plurality of predetermined operation ranges. The engine ECU 24 calculates, as a learning value, an average of a difference between the theoretical air-fuel ratio and the air-fuel ratio AF from the air-fuel ratio sensor 135a at the time when the air-fuel ratio feedback correction is made in each of learning ranges. In the engine ECU 24, a basic injection amount Qfb is corrected with the calculated learning value. The engine ECU 24 controls the in-cylinder fuel injection valve 125 and the port fuel injection valve 126 while making a feedback correction of the basic injection amount, which does not reflect the learning value until the completion of air-fuel ratio learning, with the air-fuel ratio AF from the air-fuel ratio sensor. 135a. The engine ECU 24 controls the in-cylinder fuel injection valve 125 and the port fuel injection valve 126 while making a feedback correction of the basic injection amount, which is based on the stored learning value after the completion of air-fuel ratio learning, with an air-fuel ratio Vaf. Air-fuel ratio learning is executed in each of cases where a blowing ratio Rp indicating a ratio (a percentage) of the fuel injection amount from the port fuel injection valve 126 to the fuel injection amount of the engine 22 is 1, 0.5, and 0. In the case where the value of the blowing ratio Rp is 1, fuel injection from the in-cylinder fuel injection valve 125 is stopped, fuel injection is caused only from the port fuel injection valve 126, and air-fuel ratio learning is executed. In the case where the value of the blowing ratio Rp is 0.5, fuel injection from the in-cylinder fuel injection valve 125 and the port fuel injection valve 126 is caused, and air-fuel ratio learning is executed. In the case where the blowing ratio Rp is 0, fuel injection from the port fuel injection valve 126 is stopped, fuel injection is caused only from the in-cylinder fuel injection valve 125, and air-fuel ratio learning is executed. Besides, the engine ECU 24 stores a learning history indicating whether or not each air-fuel ratio learning has been completed after the turning on of an ignition switch 80.

Although not shown in the drawing, the motor ECU 40 is configured as a microprocessor that is mainly constituted of a CPU. In addition to the CPU, the motor ECU 40 is equipped with a ROM that stores a processing program, a RAM that temporarily stores data, input/output ports, and communication ports. Signals necessary for drivingly controlling the motors MG1 and MG2 are input to the motor ECU 40 via the input ports. The signals necessary for drivingly controlling the motors MG1 and MG2 are rotational positions θm1 and θm2 from rotational position detection sensors 43 and 44 that detect rotational positions of rotors of the motors MG1 and MG2, phase currents that are applied to the motors MG1 and MG2 and detected by current sensors (not shown), and the like. A switching control signal to switching elements (not shown) of the inverters 41 and 42, and the like are output from the motor ECU 40 via the output ports. Besides, the motor ECU 40 communicates with the HVECU 70. Furthermore, the motor ECU 40 drivingly controls the motors MG1 and MG2 in accordance with a control signal from the HVECU 70, and outputs data on the operation states of the motors MG1 and MG2 to the HVECU 70 according to need. Incidentally, the motor ECU 40 calculates rotational angular velocities ωm1 and ωm2 and rotational speeds Nm1 and Nm2 of the motors MG1 and MG2 on the basis of the rotational positions θm1 and θm2 of the rotors of the motors MG1 and MG2 from the rotational position detection sensors 43 and 44 respectively.

Although not shown in the drawing, the battery ECU 52 is configured as a microprocessor that is mainly constituted of a CPU. In addition to the CPU, the battery ECU 52 is equipped with a ROM that stores a processing program, a RAM that temporarily stores data, input/output ports, and communication ports. Signals necessary for managing the battery 50 are input to the battery ECU 52. The battery ECU 52 sends data on the state of the battery 50 to the HVECU 70 through communication according to need. As the signal necessary for managing the battery 50, it is possible to mention an inter-terminal voltage Vb from a voltage sensor (not shown) that is installed between terminals of the battery 50, a charge/discharge current Ib from a current sensor (not shown) that is attached to an electric power line connected to an output terminal of the battery 50, a battery temperature Tb from a temperature sensor 51 that is attached to the battery 50, and the like. Besides, in order to manage the battery 50, the battery ECU 52 calculates, on the basis of an integrated value of the charge/discharge current Ib detected by the current sensor, a state of charge (an SOC) as a ratio of an electric power dischargeable from the battery 50 at that time to a capacity of the battery, and calculates, on the basis of the calculated state of charge SOC and the battery temperature Tb, input/output limit values Win and Wout as maximum allowable electric powers with which the battery 50 may be charged or which may be discharged from the battery 50. Incidentally, the battery ECU 52 sets basic values of the input/output limit values Win and Wout on the basis of the battery temperature Tb, sets an output limit correction coefficient and an input limit correction coefficient on the basis of the SOC of the battery 50, and multiplies the basic values of the set input and output limit values Win and Wout by the correction coefficients respectively, thereby making it possible to complete the setting.

The HVECU 70 is configured as a microprocessor that is mainly constituted of a CPU 72. In addition to the CPU 72, the HVECU 70 is equipped with a ROM 74 that stores a processing program, a RAM 76 that temporarily stores data, input/output ports, and communication ports. An ignition signal from the ignition switch 80, a shift position SP from a shift position sensor 82 that detects an operation position of a shift lever 81, an accelerator opening degree Acc from an accelerator pedal position sensor 84 that detects a depression amount of an accelerator pedal 83, a brake pedal position BP from a brake pedal position sensor 86 that detects a depression amount of a brake pedal 85, a vehicle speed V from a vehicle speed sensor 88, and the like are input to the HVECU 70 via the input ports. As described above, the HVECU 70 is connected to the engine ECU 24, the motor ECU 40, and the battery ECU. 52 via the communication ports, and exchanges various control signals and data with the engine ECU 24, the motor ECU 40, and the battery ECU 52.

In the hybrid vehicle 20 according to the embodiment of the invention thus configured, a required torque Tr* to be output to the ring gear shaft 32a as the drive shaft is calculated on the basis of the vehicle speed V and the accelerator opening degree Acc that corresponds to an amount of depression of the accelerator pedal by the driver. Furthermore, the engine 22, the motor MG1, and the motor MG2 are subjected to operation control such that a required motive power corresponding to this required torque Tr* is output to the ring gear shaft 32a. As operation control of the engine 22, the motor MG1 and the motor MG2, a torque conversion operation mode, a charge/discharge operation mode, and a motor operation mode are available. In the torque conversion operation mode, the engine 22 is subjected to operation control such that a motive power matching the required motive power is output from the engine 22, and the motor MG1 and the motor MG2 are subjected to drive control such that the entire motive power output from the engine 22 is subjected to torque conversion by the motive power distribution/integration mechanism 30, the motor MG1, and the motor MG2 and then output to the ring gear shaft 32a. In the charge/discharge operation mode, the engine 22 is subjected to operation control such that a motive power matching the sum of the required motive power and an electric power necessary for charging/discharging the battery 50 is output from the engine 22, and the motor MG1 and the motor MG2 are subjected to drive control such that the motive power that is output from the engine 22 along with the charge/discharge of the battery 50 is entirely or partially subjected to torque conversion by the motive power distribution/integration mechanism 30, the motor MG1, and the motor MG2 and the required motive power is output to the ring gear shaft 32a. In the motor operation mode, the operation of the engine 22 is stopped, and operation control is executed such that a motive power matching the required motive power from the motor MG2 is output to the ring gear shaft 32a. Incidentally, both the torque conversion operation mode and the charge/discharge operation mode are modes in which the engine 22, the motor MG1, and the motor MG2 are controlled such that the required motive power is output to the ring gear shaft 32a along with the operation of the engine 22, and there is no substantial difference in control therebetween. Thus, both the modes will be comprehensively referred to hereinafter as an engine operation mode.

In the engine operation mode, when the engine 22 is operated with load, the set required torque Tr* is multiplied by a rotational speed Nr of the ring gear shaft 32a to calculate a running power Pr*' that is required of running. For example, the rotational speed Nr is a rotational speed that is obtained by multiplying the vehicle speed V or a rotational speed that is obtained by dividing the rotational speed Nm2 of the motor MG2 by a gear ratio of the reduction gear 35, by a conversion coefficient. Furthermore, a charge/discharge required power Pb* (which assumes a positive value when electric power is discharged from the battery 50) that is obtained on the basis of the SOC of the battery 50 is subtracted from the calculated running power Pr* to set a required power Pe* as a power to be output from the engine 22. Furthermore, a target rotational speed Ne* of the engine 22 and a target torque Te* of the engine 22 are set using an operation line (e.g., an optimal fuel economy operation line) as a relationship between the rotational speed Ne of the engine 22 and the torque Te that allows the required power Pe* to be efficiently output from the engine 22. Furthermore, a torque command Tm1* as a torque to be output from the motor MG1 is set through rotational speed feedback control for making the rotational speed Ne of the engine 22 equal to the target rotational speed Ne*, within the range of the input/output limit values Win and Wout of the battery 50. Furthermore, a torque that is applied to the ring gear shaft 32a via the motive power distribution/integration mechanism 30 when the motor MG1 is driven with the torque command Tm1* is subtracted from the required torque Tr* to set a torque command Tm2* for the motor MG2. Furthermore, the target rotational speed Ne* and the target torque Te* are sent to the engine ECU 24, and the torque commands Tm1* and Tm2* are sent to the motor ECU 40.

Then, the engine ECU 24 that has received the target rotational speed Ne* and the target torque Te* executes intake air amount control, fuel injection control, ignition control, opening/closing timing control, the control of the opening degree of the EGR valve 164 and the like in the engine 22, such that the engine 22 is operated at a target operation point that is indicated by the target rotational speed Ne* and the target torque Te*.

In fuel injection control of the engine 22, first of all, a blowing ratio Rp for efficiently operating the engine 22 is set on the basis of the target rotational speed Ne* of the engine 22 and the target torque Te* of the engine 22, and the basic fuel injection amount Qfb for making the air-fuel ratio equal to a target air-fuel ratio AF* (e.g., the theoretical air-fuel ratio) is set on the basis of the intake air amount Qa from the air flow meter 148. Furthermore, an air-fuel ratio feedback correction amount ΔQf is set according to an expression (1) shown below such that the air-fuel ratio AF from the air-fuel ratio sensor 135a becomes equal to the target air-fuel ratio AF*. Furthermore, the set air-fuel ratio feedback correction amount ΔQf is added to the basic fuel injection amount Qfb to set a target fuel injection amount Qf*, and the in-cylinder fuel injection valve 125 and the port fuel injection valve 126 are controlled such that the target fuel injection amount Qf* of fuel as set at the set blowing ratio Rp is injected. It should be noted herein that the expression (1) is a relational expression in feedback control (air-fuel ratio feedback control) for making the air-fuel ratio AF equal to the target air-fuel ratio AF*. It should be noted herein that "k1" represents a gain of a proportional term, and "k2" represents a gain of an integral term in the expression (1). Incidentally, the sum of the amount of fuel injection from the in-cylinder fuel injection valve 125 and the amount of fuel injection from the port fuel injection valve 126 is the fuel injection amount of the engine 22. Therefore, the ratio of fuel injection from the in-cylinder fuel injection valve 125 to the fuel injection amount of the engine 22 is (1−Rp).

$$\Delta Qf = k1 \cdot (AF^* - AF) + k2 \cdot \int (AF^* - AF) dt \quad (1)$$

In the control of the opening degree of the EGR valve 164 of the engine 22, a target EGR ratio Re* as a target value of the EGR ratio Re is set on the basis of the target rotational speed Ne* and the target torque Te*. Furthermore, drive control of the stepping motor 163 is executed such that the opening degree of the EGR valve 164 becomes equal to an opening degree that makes the EGR ratio Re equal to the target EGR ratio Re*.

Besides, the motor ECU 40 that has received the torque commands Tm1* and Tm2* executes switching control of the switching elements of the inverters 41 and 42 such that the motors MG1 and MG2 are driven with the torque commands Tm1* and Tm2*. This control makes it possible to run with the engine 22 and the motors MG1 and MG2 controlled such that the required torque Tr* is output to the ring gear shaft 32a within the range of the input/output limits Win and Wout of the battery 50 while the engine 22 is efficiently operated along with fuel injection control and EGR control according to the blowing ratio Rp.

Besides, the HVECU 70 compares the required power Pe* with a start threshold Pstart for starting the engine 22 and a stop threshold Pstop for stopping the Operation of the engine 22, and starts the engine 22 if the required power Pe* has exceeded the start threshold Pstart when the operation of the engine 22 is stopped. On the other hand, the HVECU 70 stops the operation of the engine 22 if the required power Pe* has dropped below the stop threshold Pstop when the engine 22 is operated. In starting the engine 22, the HVECU 70 sets the torque command Tm1 of the motor MG1 for cranking the engine 22, on the basis of a start torque map for swiftly increasing the rotational speed Ne of the engine 22 and an elapsed time t since the beginning of the start of the engine 22. Furthermore, the HVECU 70 sets the torque command Tm1* to a torque that allows the engine 22 to be stably cranked at or above a rotational speed Nref upon the passage of the rotational speed Ne of the engine 22 through a resonant rotational speed zone or at or after a time needed for the rotational speed Ne of the engine 22 to pass through the resonant rotational speed zone. Furthermore, if the rotational speed Ne of the engine 22 has reached the rotational speed Nref, the HVECU 70 sets the value of the torque command Tm1* to 0 through the use of a rate processing, and sends an operation start command to the engine ECU 24 so as to start fuel injection control and ignition control of the engine 22. The engine ECU 24 that has received the operation start command starts fuel injection control and ignition control of the engine 22.

At this time, a value obtained by dividing the set torque command Tm1* by a gear ratio ρ of the motive power distribution/integration mechanism 30 is added to the required torque Tr*, and the sum is further divided by a gear ratio Gr of the reduction gear 35 to calculate a temporary motor torque Tm2tmp as a temporary value of the torque to be output from the motor MG2. Furthermore, differences between the input/output limit values Win and Wout of the battery 50 and an electric power consumption (a generated electric power) of the motor MG1 that is obtained by multiplying the set torque command Tm1* by a current rotational speed Nm1 of the motor MG1 are divided by a rotational speed Nm2 of the motor MG2 to calculate torque limits Tmin and Tmax as upper and lower limits of the torque that may be output from the motor MG2. Furthermore, the set temporary motor torque Tm2tmp is limited by the torque limits Tmin and Tmax to set a torque command Tm2* of the motor MG2, and the set torque commands Tm1* and Tm2* are sent to the motor ECU 40. The motor ECU 40 that has received the torque commands Tm1* and Tm2* executes switching control of the switching elements of the inverters 41 and 42 such that the motors MG1 and MG2 are driven with the torque commands Tm1* and Tm2*. In this manner, during the cranking of the engine 22 as well, drive control of the motor MG2 is executed such that the required torque Tr* is output to the ring gear shaft 32a.

Figure 3:
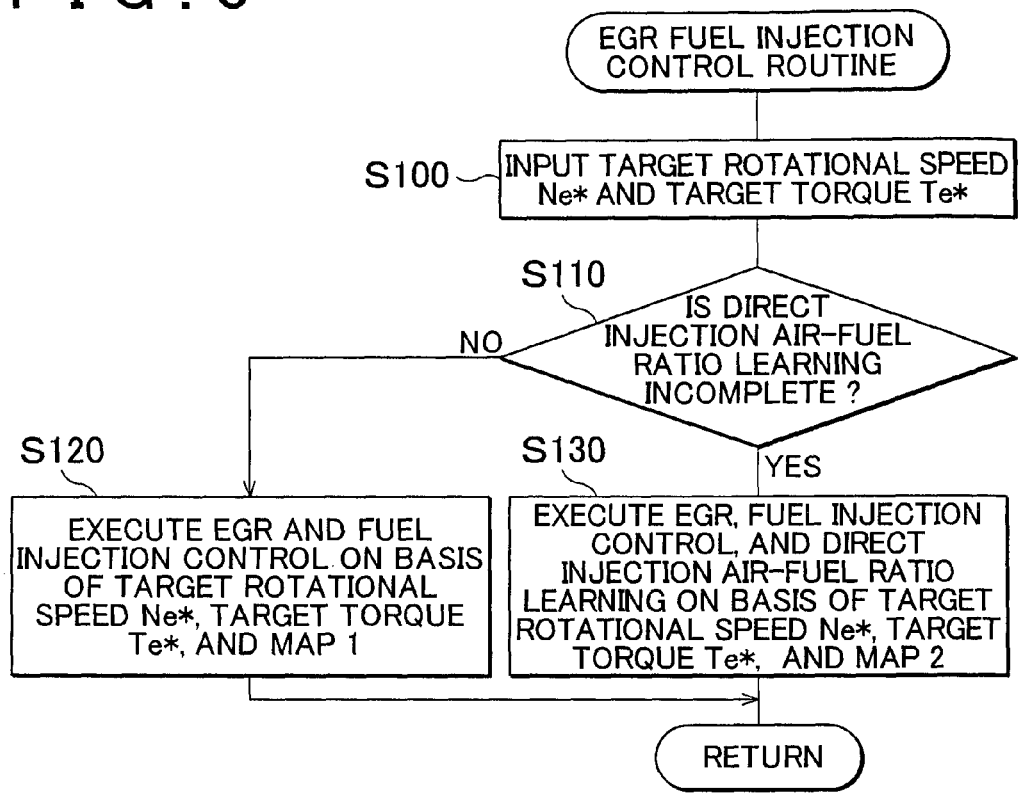
FIG. 3 is a flowchart showing an example of an EGR fuel injection control routine that is executed by an engine ECU.

Subsequently, the operation of the hybrid vehicle 20 thus configured, especially EGR control and fuel injection control in the engine 22 will be described. FIG. 3 is a flowchart showing an example of an EGR fuel injection control routine that is executed by the engine ECU 24. This routine is executed every time the target rotational speed Ne* of the engine 22 and the target torque Te* of the engine 22 are input from the HVECU 70 to the engine ECU 24 after the ignition switch 80 is turned on.

If the target rotational speed Ne* of the engine 22 and the target torque Te* of the engine 22 are input (step S100), the engine ECU 24 determines whether or not direct injection air-fuel ratio learning as air-fuel ratio learning at the time of injection of fuel from the in-cylinder fuel injection valve 125 has been completed (step S110). Direct injection air-fuel ratio learning will be described later.

Figure 4:
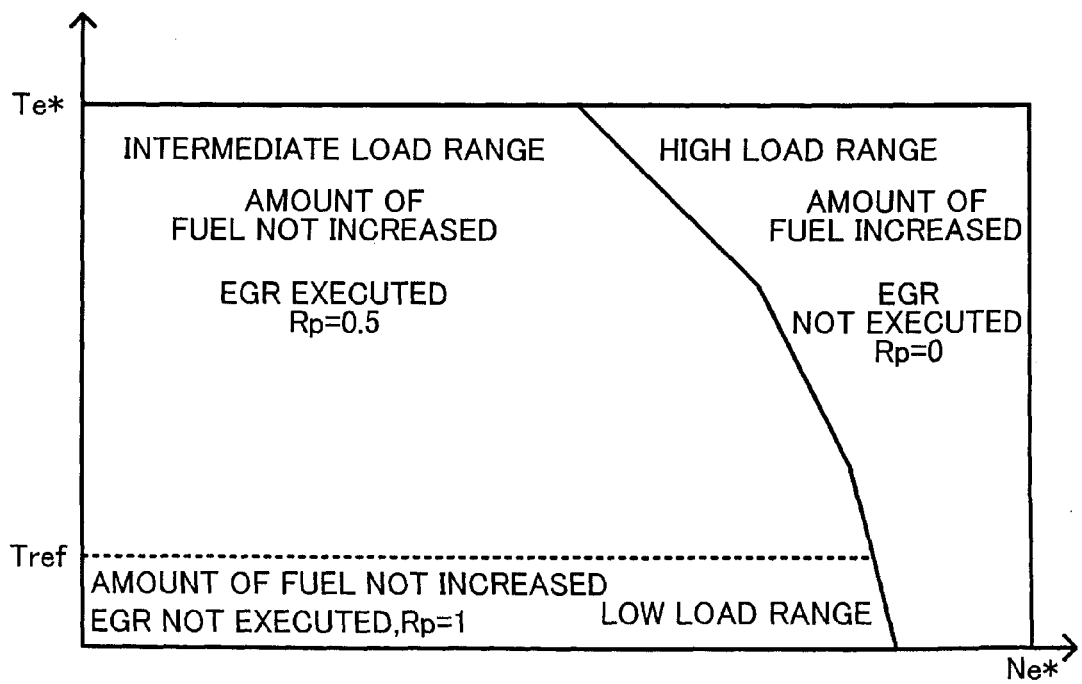
FIG. 4 is an illustrative view showing an example of a map 1.

If direct injection air-fuel ratio learning has been completed, EGR control and fuel injection control are executed in an operation state that is determined on the basis of a map 1 and a target operation point that is indicated by the target rotational speed Ne* of the engine 22 and the target torque Te of the engine 22 (step S120), and the present routine is ended. FIG. 4 shows an example of the map 1. The map 1 shows a relationship among the rotational speed of the engine 22, the engine torque, the on/off state of EGR, the blowing ratio Rp, and the determination as to whether to increase the amount of fuel or not, at the time when direct injection air-fuel ratio learning has not been completed.

If the target operation point of the engine 22 is in a low load range where the target torque Te* is low, the execution of EGR control destabilizes the operation state of the engine 22, and the injection of fuel from the in-cylinder fuel injection valve. 125 leads to a deterioration in the exhaust emission properties. Thus, EGR control is not executed, and fuel injection control is executed with the value of the blowing ratio Rp being 1, namely, such that fuel injection from the in-cylinder fuel injection valve 125 is stopped and fuel is injected only from the port fuel injection valve 126. Thus, the exhaust emission properties can be restrained, from deteriorating while stably operating the engine 22.

If the target operation point of the engine 22 is in an intermediate load range where the rotational speed is not very high and the engine torque is higher than a predetermined torque Tref, EGR control is executed, and the in-cylinder fuel injection valve 125, the port fuel injection valve 126, and the EGR valve 164 are controlled with the value of the blowing ratio Rp being 0.5, namely, such that EGR control and fuel injection control of the engine 22 are executed along with fuel injection from the in-cylinder fuel injection valve 125 and the port fuel injection valve 126. This control makes it possible to achieve enhancement of the energy efficiency by executing EGR control, and to restrain the temperature of a tip of the port fuel injection valve 126 from rising due to the supply of relatively high-temperature exhaust gas to the intake side by executing fuel injection from the port fuel injection valve 126.

If the target operation point of the engine 22 is in a high load range where the rotational speed is relatively high, a catalyst temperature θc of the exhaust device may rise. Thus, the amount of fuel is increased to restrain the catalyst temperature θc from rising. Furthermore, along with the increase in the amount of fuel, EGR control and air-fuel ratio feedback control are stopped, fuel injection from the port fuel injection valve 126 is stopped, and fuel injection control and the control of the EGR valve 164 are executed such that fuel injection occurs only from the in-cylinder fuel injection valve 125. That is, the value of the blowing ratio Rp at this time is 0. It should be noted herein that EGR is stopped to restrain the clogging of the EGR pipe 162 and the EGR valve 164, the adhesion of deposits thereto and the like from being caused by the supply of exhaust gas containing a large amount of fuel to the intake side as a result of the increase in the amount of fuel. Besides, air-fuel ratio feedback control is stopped because the supply of exhaust gas containing a large amount of fuel to the intake side makes it impossible to execute suitable air-fuel ratio feedback control. Furthermore, fuel injection from the port fuel injection valve 126 is stopped, and fuel injection is caused only from the in-cylinder fuel injection valve 125 so as to restrain the temperature of the tip of the in-cylinder fuel injection valve 125 from rising due to the increase in the amount of fuel. Incidentally, since air-fuel ratio feedback control is not executed, the basic fuel injection amount Qfb that is set through the use of the learning value obtained in direct injection air-fuel ratio learning is set as the target fuel injection amount Qf*, and fuel injection control is executed such that the amount of fuel that is obtained by multiplying the set target fuel injection amount Qf* by an amount increasing coefficient ρ is injected from the in-cylinder fuel injection valve 125. This control makes it possible to restrain the catalyst temperature θc from rising, and to restrain the temperature of the in-cylinder fuel injection valve 125 from rising.

Figure 5:
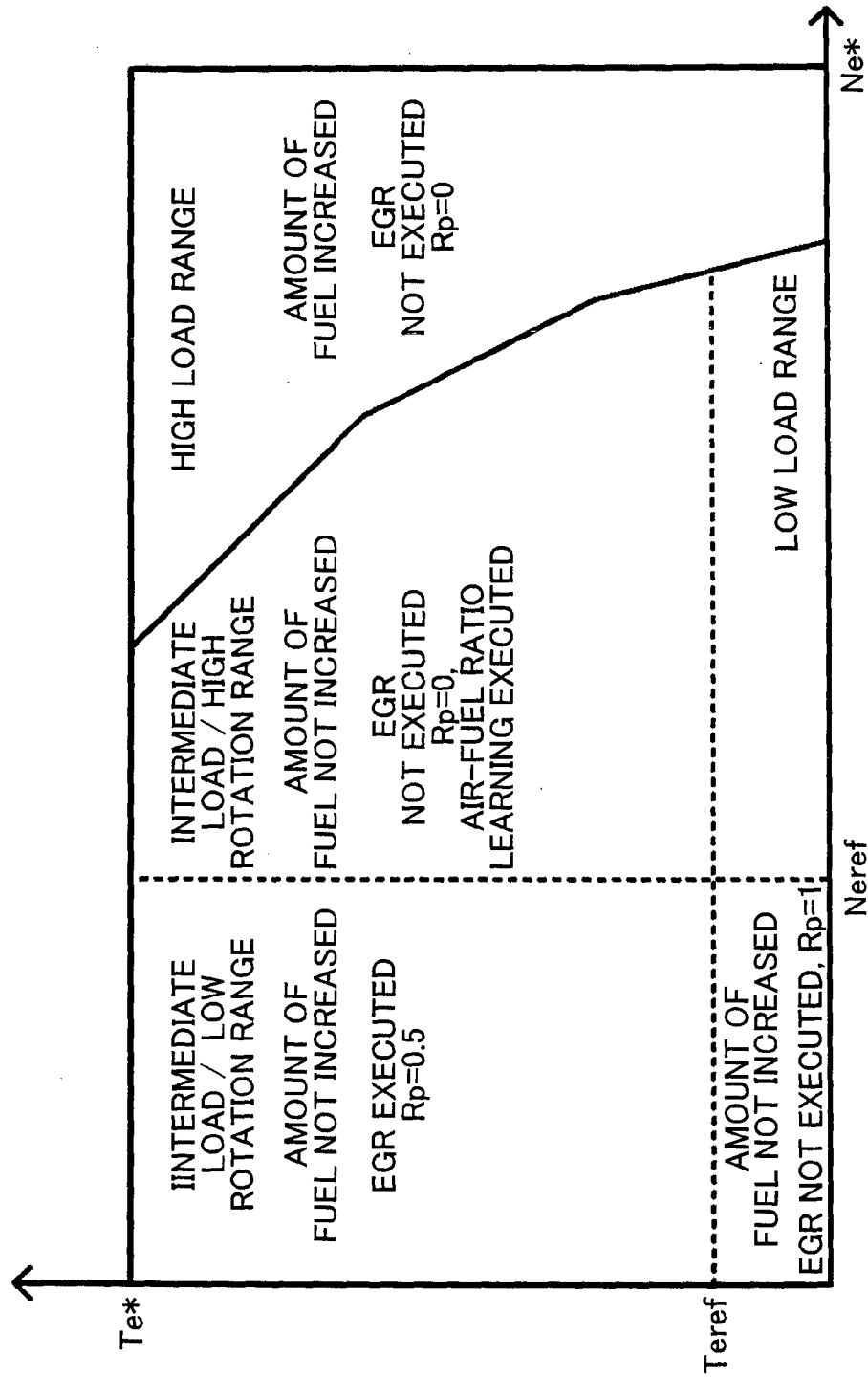
FIG. 5 is an illustrative view showing an example of a map 2.

If direct injection air-fuel ratio learning has not been completed, EGR control and fuel injection control are executed in an operation state that is determined on the basis of the target rotational speed Ne* of the engine 22, the target torque Te* of the engine 22, and a map 2 instead of the map 1 (step S130). FIG. 5 shows an example of the map 2. The map 2 shows a relationship among the target rotational speed Ne* of the engine 22, the target torque Te* of the engine 22, the on/off state of EGR, the blowing ratio Rp, and the determination as to whether to increase the amount of fuel or not, at the time when fuel amount increase range air-fuel ratio learning has not been completed. The reason why the map 2 is used instead of the map 1 when direct injection air-fuel ratio learning has not been completed will be described later. The same control as in the low load range and the high load range in the map 1 is executed in a low load range and a high load range in the map 2, and hence will not be described.

In the map 2, if the target operation point of the engine 22 is in an intermediate load/low rotational speed range where the engine rotational speed is equal to or lower than a predetermined rotational speed Neref (e.g., 2800 rpm or the like) and the engine torque is equal to or higher than a predetermined torque Teref, EGR control is executed as in the intermediate load range in the aforementioned map 1. Furthermore, along with EGR control, fuel injection control is executed such that fuel injection occurs with the value of the blowing ratio Rp being 0.5. Thus, it is possible to achieve enhancement of the energy efficiency, and to restrain the temperature of the tip of the port fuel injection valve 126 from rising due to exhaust gas that is supplied to the intake side through EGR control.

If the target operation point of the engine 22 is in an intermediate load/high rotation range where the engine rotational speed is equal to or higher than the predetermined rotational speed Neref and the load is lower than in the high load range, EGR is stopped, and fuel injection from the port fuel injection valve 126 is stopped. Furthermore, along with the stop of fuel injection from the port fuel injection valve, fuel injection control is executed such that fuel injection occurs only from the in-cylinder fuel injection valve 125, and direct injection air-fuel ratio learning is executed. That is, the blowing ratio Rp at this time is 0. The reason why the operation state of the engine 22 is determined through the use of the map 2 when direct injection air-fuel ratio learning has not been completed will now be described. In the aforementioned map 1, direct injection air-fuel ratio learning can be executed only in the high load range where the amount of fuel is increased. However, air-fuel ratio feedback control is not executed when the amount of fuel is increased. Thus, the use of the map 1 leads to an inconvenience that the opportunity to execute direct injection air-fuel ratio learning is lost. In order to avoid such an inconvenience, if direct injection air-fuel ratio learning has not been completed, the operation state of the engine 22 is determined through the use of the map 2, and direct injection air-fuel ratio learning is executed. Thus, direct injection air-fuel ratio learning can be more suitably executed. Besides, if the target rotational speed Ne* of the engine 22 and the target torque Te* of the engine 22 are in the high load range, fuel injection control of the engine 22 is executed along with the increase in the amount of fuel, using the learning value obtained from this direct injection air-fuel ratio learning. Therefore, the exhaust emission properties can be restrained from deteriorating when the amount of fuel is increased.

This control makes it possible to stably operate the engine 22 by executing EGR control and fuel injection control of the engine 22 while executing air-fuel ratio feedback control if direct injection air-fuel ratio learning has been completed when the amount of fuel is not increased.

Besides, if direct injection air-fuel ratio learning has not been completed when the amount of fuel is not increased, fuel injection from the port fuel injection valve 126 is stopped without executing EGR. Furthermore, along with the stop of fuel injection from the port fuel injection valve, fuel injection control is executed such that fuel injection occurs only from the in-cylinder fuel injection valve 125, and direct injection air-fuel ratio learning is executed. Thus, direction injection air-fuel ratio learning can be more suitably executed.

Then, when the amount of fuel is increased, EGR and air-fuel ratio feedback control are not executed, and the basic fuel injection amount Qfb that is set through the use of the learning value obtained from direct injection air-fuel ratio learning is set as the target fuel injection amount Qf*. Furthermore, EGR control and fuel injection control in which the amount of fuel as the value obtained by multiplying the set target fuel injection amount Qf* by the amount increasing coefficient ρ is injected only from the in-cylinder fuel injection valve 125 are executed. Thus, it is possible to restrain the catalyst temperature θc from rising, suppress the occurrence of the clogging of the EGR pipe 162 and the EGR valve 164, the adhesion of deposits thereto and the like, and restrain the temperature of the tip of the in-cylinder fuel injection valve, 125 from rising. Besides, fuel injection control is executed through the use of the learning value that is obtained when the engine 22 is operated through fuel injection only from the in-cylinder fuel injection valve 125. Therefore, the exhaust emission properties can be restrained from deteriorating.

In the hybrid vehicle 20 according to the embodiment of the invention described above, if direct injection air-fuel ratio learning has been completed when the amount of fuel is not increased, the engine 22 and the EGR valve 164 are controlled such that the engine 22 is operated along with EGR control and fuel injection from the in-cylinder fuel injection valve 125 and the port fuel injection valve 126, while executing air-fuel ratio feedback control. Thus, the engine 22 can be stably operated. Besides, if direct injection air-fuel ratio learning has not been completed, fuel injection from the port fuel injection valve 126 is stopped without executing EGR control, fuel injection control is executed such that fuel injection occurs only from the in-cylinder fuel injection valve 125, and direct injection air-fuel ratio learning is executed. Thus, direct injection air-fuel ratio learning can be more suitably executed. Then, when the amount of fuel is increased, fuel injection from the port fuel injection valve 126 is stopped without executing EGR and air-fuel ratio feedback control, and the engine 22 and the EGR valve 164 are controlled such that the amount of fuel that uses the learning value obtained from direct injection air-fuel ratio learning is injected only from the in-cylinder fuel injection valve 125. Thus, it is possible to restrain the catalyst temperature θc from rising, suppress the occurrence of the clogging of the EGR pipe 162 and the EGR valve 164, the adhesion of deposits thereto and the like, and restrain the temperature of the tip of the in-cylinder fuel injection valve 125 from rising. Furthermore, the exhaust emission properties can be restrained from deteriorating.

In the hybrid vehicle 20 according to the embodiment of the invention, if the target operation point of the engine 22 is in the intermediate load range in the map 1 or in the intermediate load/low rotation range in the map 2, the engine 22 is operated along with fuel injection from the in-cylinder fuel injection valve 125 and the port fuel injection valve 126 with the value of the blowing ratio Rp being 0.5. However, the blowing ratio Rp may assume any value, for example, a value that is larger than 0.5 or a value that is smaller than 0.5.

In the hybrid vehicle 20 according to the embodiment of the invention, each of the maps 1 and 2 shows a relationship among the rotational speed of the engine 22, the torque, the on/off state of EGR, the blowing ratio Rp, and the determination as to whether to increase the amount of fuel or not, as to EGR, the blowing ratio Rp, and the learning range of air-fuel ratio learning, in accordance with the target operation point of the engine 22. However, the intake air amount Qa of the engine 22 may be used instead of the target rotational speed Ne* of the engine 22.

Figure 6:
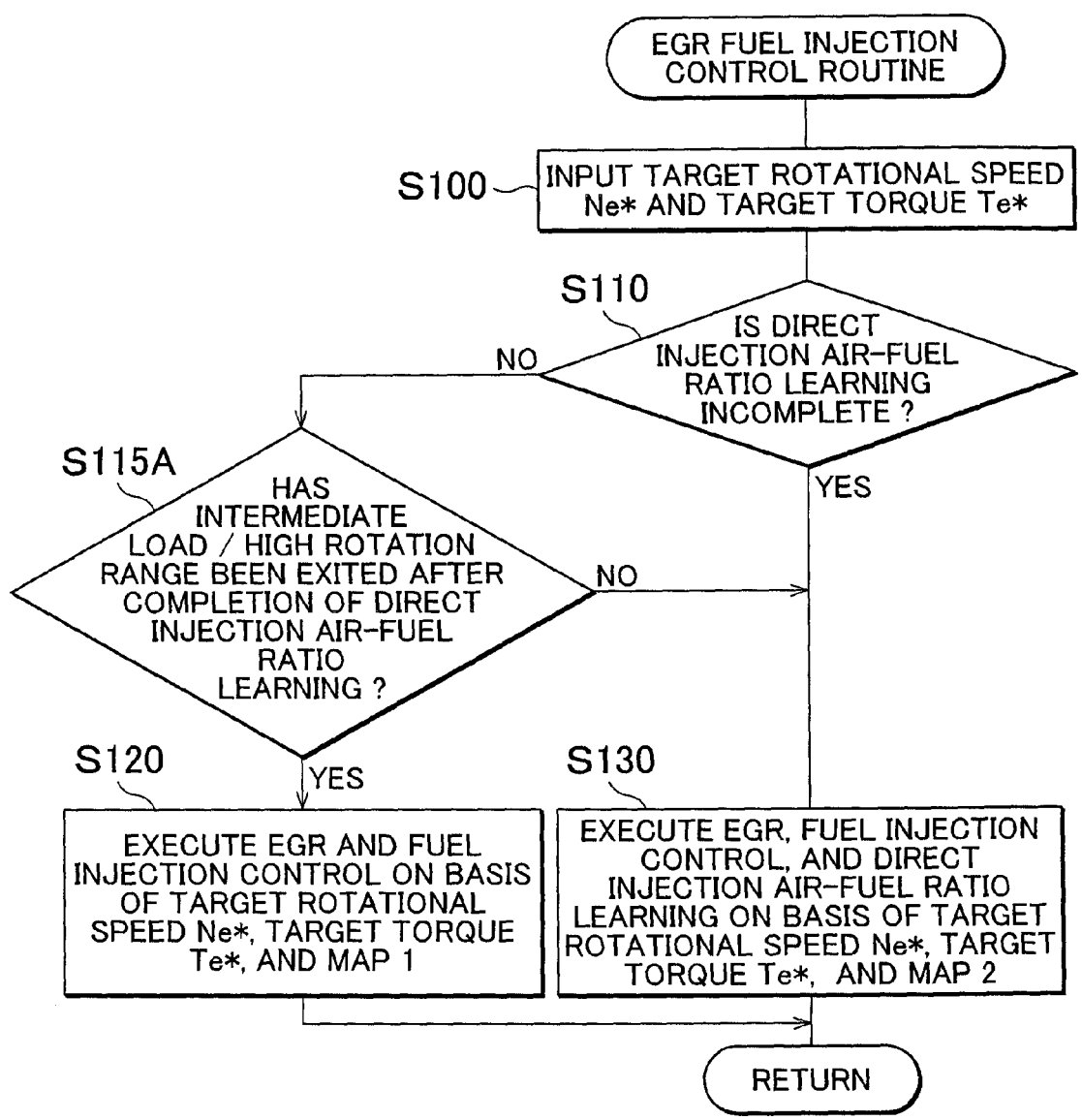
FIG. 6 is a flowchart showing an example of an EGR fuel injection control routine according to a modification example.

In the hybrid vehicle 20 according to the embodiment of the invention, if direct injection air-fuel ratio learning has been completed, the engine 22 is operated in the operation state that is determined by the map 1. As indicated by an EGR fuel injection control routine according to a modification example of FIG. 6, after the completion of direct injection air-fuel ratio learning, the engine 22 may be operated in the operation state that is determined from the map 2 if the target operation point of the engine 22 is in the intermediate load/high rotation range in the map 2 (steps S100 to S115A and S130), and the engine 22 may be operated in the operation state that is determined by the map 1 if the target operation point of the engine 22 has moved to a range other than the intermediate load/high rotation range in the map 2 (steps S100 to S120).

Figure 7:
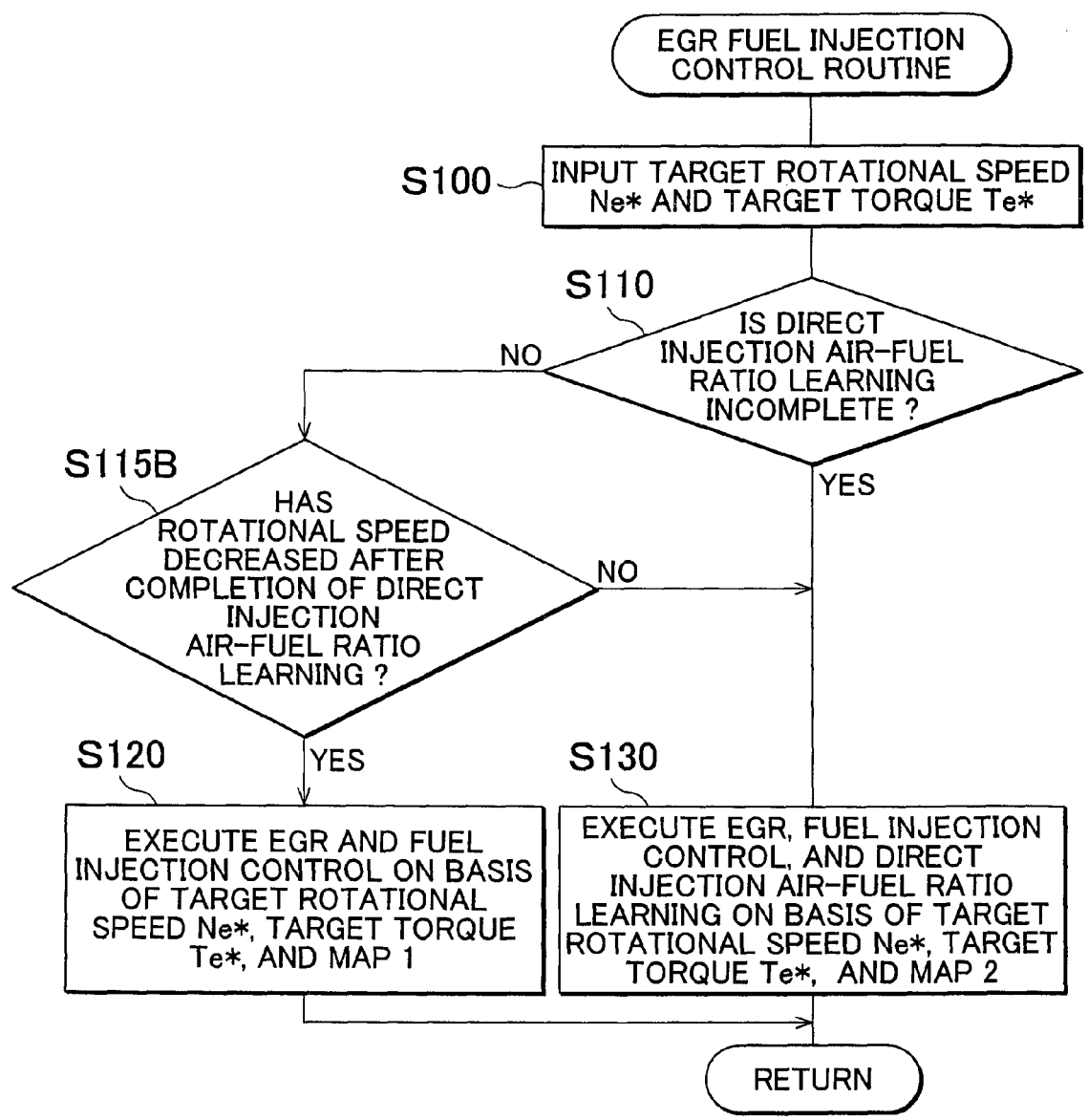
FIG. 7 is a flowchart showing an example of an EGR fuel injection control routine according to another modification example.

In the hybrid vehicle 20 according to the embodiment of the invention, if direct injection air-fuel ratio learning has been completed, the engine 22 is operated in the operation state that is determined by the map 1. As indicated by an EGR fuel injection control routine according to a modification example of FIG. 7, even if direct injection air-fuel ratio learning has been completed, the engine 22 may be operated in the operation state that is determined by the map 2 until the rotational speed of the engine 22 becomes lower than the predetermined rotational speed Nref (steps S100 to S115B and S130), and the engine 22 may be operated in the operation state that is determined by the map 1 after the rotational speed of the engine 22 has become lower than the predetermined rotational speed Nref (steps S100 to S120).

In the hybrid vehicle 20 according to the embodiment of the invention, the EGR fuel injection control routine exemplified in FIG. 3 is executed every time the target rotational speed Ne* of the engine 22 and the target torque Te* of the engine 22 are input from the HVECU 70 to the engine ECU 24 after the ignition switch 80 is turned on. This EGR fuel injection control routine may also be executed within a period from the start of the engine 22 resulting from an increase in the required power Pe* beyond the start threshold Pstart at the time when the operation of the engine 22 is first stopped after the ignition switch 80 is turned on to the stop of the engine 22 resulting from a subsequent decrease in the required power Pe* below the stop threshold Pstop. Thus, the exhaust emission properties can be restrained from deteriorating after the engine 22 is first started in response to the turning on of the ignition switch 80.

Figure 8:
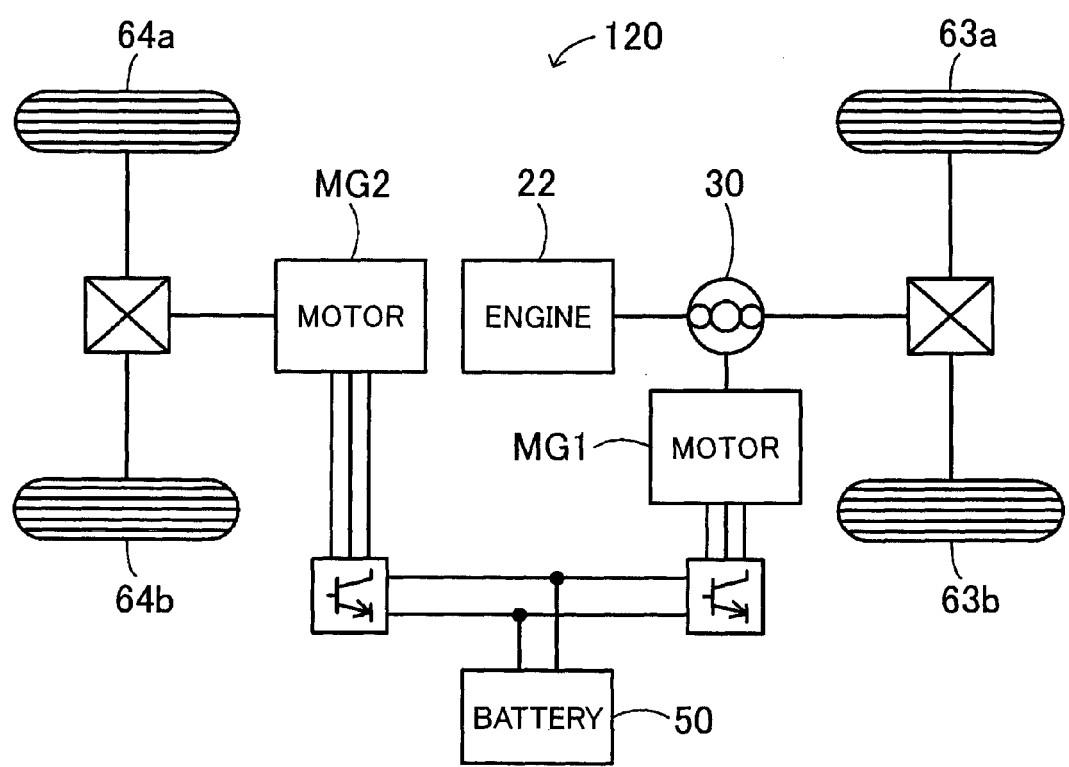
FIG. 8 is a block diagram showing the outline of a configuration of a hybrid vehicle according to a modification example.

In the hybrid vehicle 20 according to the embodiment of the invention, the motive power of the motor MG2 is output to the ring gear shaft 32a as the drive shaft to which the driving wheels 63a and 63b are connected. As exemplified by a hybrid vehicle 120 according to a modification example of FIG. 8, the motive power of the motor MG2 may be output to an axle (an axle to which wheels 64a and 64b in FIG. 8 are connected) other than the axle to which the driving wheels 63a and 63b are connected.

Figure 9:
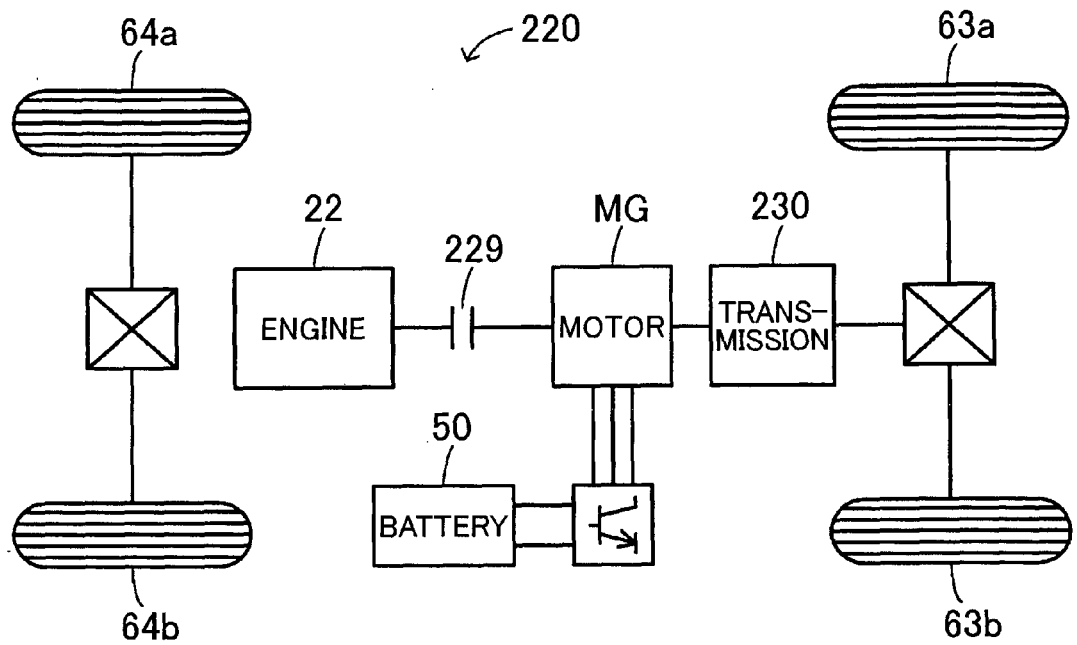
FIG. 9 is a block diagram showing the outline of a configuration of a hybrid vehicle according to a modification example.
Figure 10:
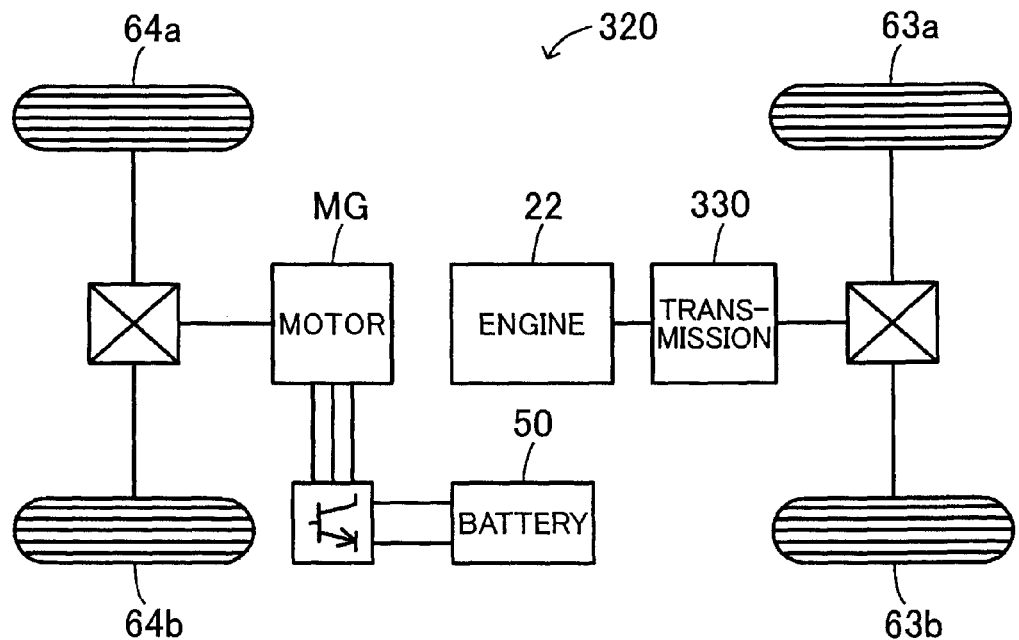
FIG. 10 is a block diagram showing the outline of a configuration of a hybrid vehicle according to a modification example.
Figure 11:
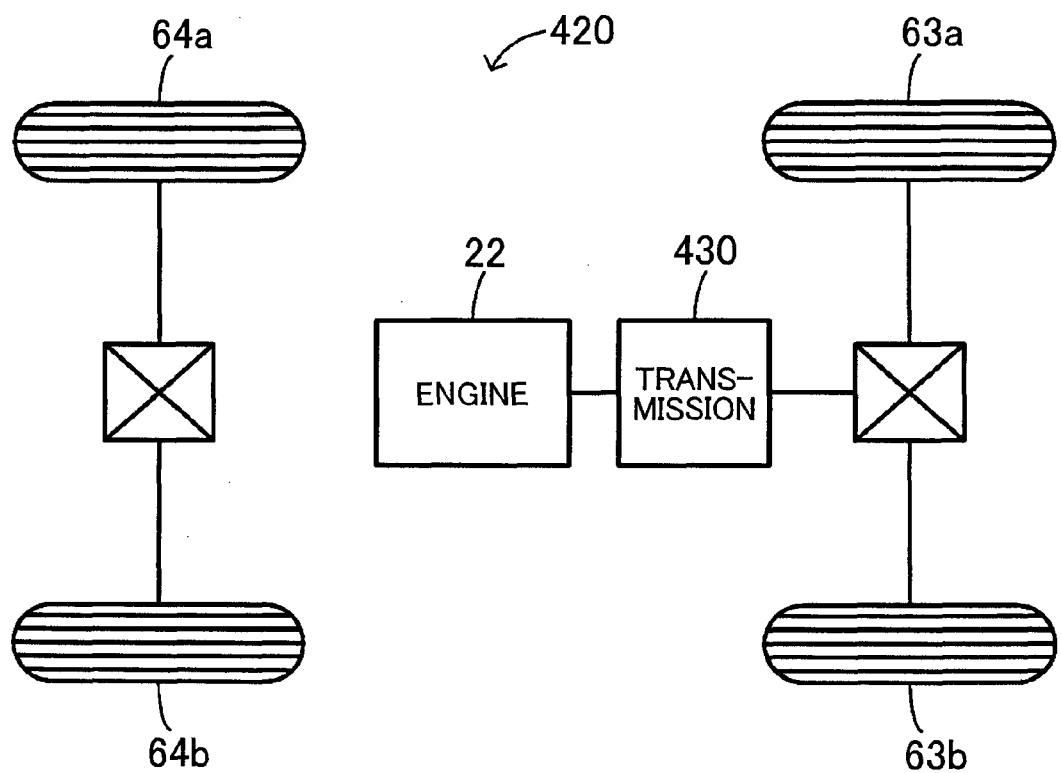
FIG. 11 is a block diagram showing the outline of a configuration of a hybrid vehicle according to a modification example.

In the hybrid vehicle 20 according to the embodiment of the invention, the motive power from the engine 22 is output to the ring gear shaft 32a to which the driving wheels 63a and 63b are connected, via the motive power distribution/integration mechanism 30, and the motive power from the motor MG2 is output to the ring gear shaft 32a. As exemplified by a hybrid vehicle 220 according to a modification example of FIG. 9, there may be adopted a configuration in which a motor MG is attached to a drive shaft to which the driving wheels 63a and 63b are connected, via a transmission 230, and the engine 22 is connected to a rotary shaft of the motor MG via a clutch 229. A motive power from the engine 22 may be output to the drive shaft via the rotary shaft of the motor MG and the transmission 230, and a motive power from the motor MG may be output to the drive shaft via the transmission 230. Besides, as exemplified by a hybrid vehicle 320 according to a modification example of FIG. 10, a motive power from the engine 22 may be output to an axle to which the driving wheels 63a and 63b are connected, via a transmission 330, and a motive power from the motor MG may be output to an axle (an axle that is connected to the wheels 64a and 64b in FIG. 9) other than the axle to which the driving wheels 63a and 63b are connected. Furthermore, as exemplified by a hybrid vehicle 420 according to a modification example of FIG. 11, a motor that outputs a motive power for running may not be provided, and a motive power from the engine 22 may be output to the axle to which the driving wheels 63a and 63b are connected, via a transmission 430.

A corresponding relationship with the main elements of the invention will be described. In the embodiment of the invention, the internal combustion engine is equivalent to "the engine 22", the EGR system 160 is equivalent to "the exhaust gas recirculation device", and the engine ECU 24 is equivalent to "the control device".

It should be noted herein that "the internal combustion engine" is not limited to the engine 22, but may be configured in any manner as long as it is equipped with an in-cylinder fuel injection valve that injects fuel into a cylinder, a port fuel injection valve that injects fuel into an intake port, and a purification catalyst that is provided in an exhaust system. "The exhaust gas recirculation device" is not limited to the EGR system 160, but may be configured in any manner as long as it is a device that executes exhaust gas recirculation to recirculate exhaust gas of an internal combustion engine to an intake system of the internal combustion engine. "The fuel amount non-increase control means" is not limited to the engine ECU 24 that controls the engine 22 and the EGR valve 164 along with EGR of the engine 22 and fuel injection from the in-cylinder fuel injection valve 125 and the port fuel injection valve 126 if direct injection air-fuel ratio learning has been completed when the amount of fuel is not increased, and stops fuel injection from the port fuel injection valve 126 without executing EGR, controls the engine 22 and the EGR valve 164 such that fuel injection occurs only from the in-cylinder fuel injection valve 125, and executes direct injection air-fuel ratio learning if direct injection air-fuel ratio learning has not been completed when the amount of fuel is not increased, but may be configured in any manner as long as it controls the internal combustion engine such that the internal combustion engine is operated along with fuel injection from at least the port fuel injection valve and exhaust gas recirculation by the exhaust gas recirculation device if in-cylinder fuel injection air-fuel ratio learning by which the fuel injection amount for making the air-fuel ratio approach the theoretical air-fuel ratio is learned when fuel injection from the port fuel injection valve is stopped and fuel is injected from the in-cylinder fuel injection valve has been completed when the internal combustion engine is operated without increasing the amount of fuel for adjusting the temperature of the purification catalyst in fuel injection of the internal combustion engine, and stops fuel injection from the port fuel injection valve and exhaust gas recirculation by the exhaust gas recirculation device, controls the internal combustion engine such that the internal combustion engine is operated along with fuel injection by the in-cylinder fuel injection valve, and executes in-cylinder fuel injection air-fuel ratio learning if in-cylinder fuel injection air-fuel ratio learning has not been completed when the internal combustion engine is operated without increasing the amount of fuel for adjusting the temperature of the purification catalyst in fuel injection of the internal combustion engine. "The fuel amount increase control means" is not limited to the engine ECU 24 that stops fuel injection from the port fuel injection valve 126 without executing EGR and air-fuel ratio feedback control and controls the engine 22 and the EGR valve 164 such that fuel injection occurs only from the in-cylinder fuel injection valve 125 when the amount of fuel is increased, but may be configured in any manner as long as it stops fuel injection from the port fuel injection valve and exhaust gas recirculation by the exhaust gas recirculation device and controls the internal combustion engine such that the internal combustion engine is operated along with the injection of the amount of fuel that uses the learning value obtained from in-cylinder fuel injection air-fuel ratio learning from the in-cylinder fuel injection valve when the internal combustion engine is operated along with an increase in the amount of fuel.

Incidentally, as for the corresponding relationship with the main elements of the invention, the embodiment of the invention is an example for concretely illustrating the mode for carrying out the invention as described in the section of means for solving the problem. Thus, the elements of the invention described in the section of means for solving the problem should not be limited. That is, the invention described in the section of means for solving the problem should be interpreted on the basis of what is described in the section, and the embodiment of the invention is nothing more than a concrete example of the invention described in the section of means for solving the problem.

Although the mode for carrying out the invention has been described above using the embodiment thereof, the invention is not limited at all to this embodiment thereof. As a matter of course, the invention can be carried out in various modes without departing from the gist thereof.

The invention is available in industries for manufacturing control devices for internal combustion engines and hybrid vehicles, and the like.

The invention claimed is:

1. A control device for an internal combustion engine equipped with
   an in-cylinder fuel injection valve configured to inject fuel into a cylinder,
   a port fuel injection valve configured to inject the fuel into an intake port,
   a purification catalyst provided in an exhaust system, and
   an exhaust gas recirculation device configured to recirculate exhaust gas of the internal combustion engine to an intake system of the internal combustion engine, the control device comprising:
   a controller configured to execute first control in which a temperature of a catalyst is adjusted by increasing a fuel injection amount in comparison with an amount during normal operation,
   the controller being configured to execute second control in which a fuel injection amount of the in-cylinder fuel injection valve is learned by stopping fuel injection from the port fuel injection valve and executing fuel injection from the in-cylinder fuel injection valve such that an air-fuel ratio approaches a theoretical air-fuel ratio,
   the controller being configured to execute the fuel injection from the port fuel injection valve and execute exhaust gas recirculation control by the exhaust gas recirculation device when the first control is not executed and execution of the second control has been completed,
   the controller being configured to stop the fuel injection from the port fuel injection valve and the exhaust gas recirculation control by the exhaust gas recirculation device and execute fuel injection control from the in-cylinder fuel injection valve and the second control, when the first control is not executed and the execution of the second control has not been completed, and
   the controller being configured to stop the fuel injection from the port fuel injection valve and the exhaust gas recirculation control by the exhaust gas recirculation device when the first control is executed, and execute the fuel injection from the in-cylinder fuel injection valve with a fuel injection amount based on a learning value obtained through the second control.

2. The control device according to claim 1, wherein the controller executes the fuel injection from the in-cylinder fuel injection valve and the exhaust gas recirculation control by the exhaust gas recirculation device when the execution of the second control has been completed and a rotational speed of the internal combustion engine is lower than a predetermined rotational speed.

3. The control device according to claim 1, wherein the controller executes the fuel injection from the in-cylinder fuel injection valve and the exhaust gas recirculation control by the exhaust gas recirculation device when the execution of the second control has been completed and an intake air amount of the internal combustion engine is smaller than a predetermined air, amount.

4. A hybrid vehicle comprising:
an in-cylinder fuel injection valve configured to inject fuel into a cylinder;
a port fuel injection valve configured to inject the fuel into an intake port;
a purification catalyst provided in an exhaust system;
an exhaust gas recirculation device configured to execute exhaust gas recirculation control in which exhaust gas of an internal combustion engine is recirculated to an intake system of the internal combustion engine;
the internal combustion engine configured to output a motive power from an output shaft of the internal combustion engine to a drive shaft that is coupled to an axle;
an electric motor configured to input and output a motive power between the drive shaft and the electric motor;
a battery configured to exchange an electric power with the electric motor; and
a controller configured to execute first control in which a temperature of a catalyst is adjusted by increasing a fuel injection amount in comparison with an amount during normal operation,
the controller being configured to execute second control in which a fuel injection amount of the in-cylinder fuel injection valve is learned by stopping fuel injection from the port fuel injection valve and executing fuel injection from the in-cylinder fuel injection valve such that an air-fuel ratio approaches a theoretical air-fuel ratio,
the controller being configured to execute the fuel injection from the port fuel injection valve and execute exhaust gas recirculation control by the exhaust gas recirculation device when the first control is not executed and execution of the second control has been completed,
the controller being configured to stop the fuel injection from the port fuel injection valve and the exhaust gas recirculation control by the exhaust gas recirculation device and execute fuel injection control from the in-cylinder fuel injection valve and the second control, when the first control is not executed and the execution of the second control has not been completed, and
the controller being configured to stop the fuel injection from the port fuel injection valve and the exhaust gas recirculation control by the exhaust gas recirculation device when the first control is executed, and execute the fuel injection from the in-cylinder fuel injection valve with a fuel injection amount based on a learning value obtained through the second control.

5. The hybrid vehicle according to claim 4, wherein the controller executes fuel injection from the port fuel injection valve and the exhaust gas recirculation control by the exhaust gas recirculation device when the execution of the second control has been completed within a period from a beginning of operation after first start of the internal combustion engine since turning on of ignition to stop of the internal combustion engine, and
the controller stops the fuel injection from the port fuel injection valve and the exhaust gas recirculation control by the exhaust gas recirculation device and executes the fuel injection by the in-cylinder fuel injection valve and the second control, when the execution of the second control has not been completed within the period from the beginning of the operation after the first start of the internal combustion engine since turning on of the ignition to stop of the internal combustion engine.

6. The hybrid vehicle according to claim 4, further comprising:
an electric generator configured to input and output a motive power; and
a planetary gear mechanism having three rotary elements connected to the drive shaft, the output shaft of the internal combustion engine, and a rotary shaft of the electric generator respectively.

* * * * *

UNITED STATES PATENT AND TRADEMARK OFFICE
CERTIFICATE OF CORRECTION

| | |
|---|---|
| PATENT NO. | : 9,243,575 B2 |
| APPLICATION NO. | : 14/419388 |
| DATED | : January 26, 2016 |
| INVENTOR(S) | : Daigo Ando |

It is certified that error appears in the above-identified patent and that said Letters Patent is hereby corrected as shown below:

On the title page, Item (71), the Applicant's city of residence and Item (72), the Inventor's city of residence are incorrect. Items (71) and (72) should read:

--(71) Applicant: Daigo Ando, Nagoya-shi (JP)

(72) Inventor: Daigo Ando, Nagoya-shi (JP)--

On the title page, Item (73), the Assignee's information is incorrect. Item (73) should read:

--(73) Assignee: TOYOTA JIDOSHA KABUSHIKI KAISHA, Toyota-shi (JP)--

Signed and Sealed this
Tenth Day of May, 2016

Michelle K. Lee
*Director of the United States Patent and Trademark Office*